United States Patent
Harvey

(10) Patent No.: US 9,352,978 B2
(45) Date of Patent: May 31, 2016

(54) TREATMENT OF STORM WATER

(71) Applicant: Gunderson LLC, Portland, OR (US)

(72) Inventor: David James Harvey, Happy Valley, OR (US)

(73) Assignee: Gunderson LLC, Portland, OR (US)

( * ) Notice: Subject to any disclaimer, the term of this patent is extended or adjusted under 35 U.S.C. 154(b) by 210 days.

(21) Appl. No.: 14/290,581

(22) Filed: May 29, 2014

(65) Prior Publication Data

US 2014/0353225 A1   Dec. 4, 2014

Related U.S. Application Data

(60) Provisional application No. 61/864,997, filed on Aug. 12, 2013, provisional application No. 61/828,612, filed on May 29, 2013.

(51) Int. Cl.
| | |
|---|---|
| *C02F 3/04* | (2006.01) |
| *C02F 1/28* | (2006.01) |
| *B01D 24/14* | (2006.01) |
| *E03F 5/10* | (2006.01) |
| *C02F 1/00* | (2006.01) |
| *B01D 36/02* | (2006.01) |
| *B01D 24/40* | (2006.01) |
| *C02F 101/20* | (2006.01) |
| *C02F 103/00* | (2006.01) |

(52) U.S. Cl.
CPC ............. *C02F 1/001* (2013.01); *B01D 24/14* (2013.01); *B01D 24/40* (2013.01); *B01D 36/02* (2013.01); *C02F 1/286* (2013.01); *C02F 3/04* (2013.01); *E03F 5/101* (2013.01); *C02F 3/043* (2013.01); *C02F 2101/20* (2013.01); *C02F 2103/001* (2013.01); *C02F 2203/002* (2013.01); *C02F 2203/008* (2013.01); *Y02W 10/15* (2015.05)

(58) Field of Classification Search
CPC ............ C02F 1/101; C02F 1/286; C02F 3/04; C02F 3/043; C02F 2101/20; C02F 2103/001; C02F 2203/002; C02F 2203/008; B01D 24/12; B01D 24/14; B01D 24/40; E03F 5/101
USPC ............ 210/150, 151, 170.03, 293, 615, 617, 210/688, 747.3
See application file for complete search history.

(56) References Cited

U.S. PATENT DOCUMENTS

| | | | |
|---|---|---|---|
| 5,240,611 A * | 8/1993 | Burton | ...................... C02F 3/04 210/151 |
| 5,322,629 A | 6/1994 | Stewart | |

(Continued)

*Primary Examiner* — Christopher Upton
(74) *Attorney, Agent, or Firm* — Chernoff, Vihauer, McClung & Stenzel, LLP

(57) ABSTRACT

A treatment system for collecting storm water from an industrial area and removing suspended and dissolved pollutant materials from the storm water. Storm water is accumulated and delivered to a filtration apparatus in which suspended pollutants are removed by filtration, while dissolved materials, particularly heavy metals including zinc and copper, are removed by chemical chelation in a bed of compost filter media having a high humic acid content and which is kept consistently moist. A sparger provides for wide and generally uniform distribution of the storm water over the bed of filter media and provides for slow passage of the storm water through the filter bed, thus giving a long contact time of the storm water with the filter media in order to promote and enhance chemical chelation progress to chemical equilibrium and removal of a high percentage of dissolved metals, and particularly dissolved copper and zinc.

9 Claims, 11 Drawing Sheets

(56) References Cited

U.S. PATENT DOCUMENTS

| | | | |
|---|---|---|---|
| 5,387,344 A * | 2/1995 | McCombs | C02F 1/20 210/617 |
| 5,707,527 A | 1/1998 | Knutson et al. | |
| 6,027,639 A | 2/2000 | Lenhart, Jr. et al. | |
| 6,100,081 A | 8/2000 | Buelna | |
| 7,037,423 B2 | 5/2006 | Herman et al. | |
| 7,186,058 B2 | 3/2007 | Schluter et al. | |
| 7,214,311 B2 | 5/2007 | Aberle et al. | |
| 7,288,192 B2 * | 10/2007 | Jowett | C02F 3/04 210/150 |
| 7,419,591 B2 | 9/2008 | Aberle et al. | |
| 7,517,450 B2 | 4/2009 | Hersey et al. | |
| 7,575,683 B2 * | 8/2009 | Kauppi | C02F 3/327 210/150 |
| 8,110,099 B2 | 2/2012 | Hersey et al. | |
| 8,110,105 B2 | 2/2012 | Allen, II et al. | |
| 8,147,688 B2 | 4/2012 | Adams et al. | |
| 8,216,479 B2 | 7/2012 | Lamberg, V et al. | |
| 2008/0277351 A1 * | 11/2008 | Harman | C02F 1/286 210/691 |
| 2009/0101555 A1 * | 4/2009 | Scarpine | E03F 5/101 210/170.03 |
| 2010/0096333 A1 * | 4/2010 | Foreman | C02F 1/288 210/170.03 |
| 2014/0001127 A1 * | 1/2014 | Hymel | C02F 3/327 210/170.03 |

* cited by examiner

TREATMENT OF STORM WATER

The present application is directed to treatment of water, especially storm water runoff, to reduce levels of contaminants such as heavy metals, and in particular is directed to a storm water filter treatment apparatus that includes a bed of filter media in a conveniently constructed water treatment container.

BACKGROUND OF THE INVENTION

Heavy metals such as copper, zinc, and lead are common pollutants in solution and in suspension in industrial storm water runoff in the U.S. The U.S. Environmental Protection Agency regulates the quantity, quality, and ongoing monitoring of storm water runoff from industrial facility sites pursuant to Multi-Sector General Storm Water regulations contained in the Clean Water Act.

Heavy metals exist in industrial runoff primarily from rainfall contact with automobiles, tire wear, brake pad wear, hydraulic oil, engine oil, building structures, specifically metal roofs, gutters, and metal siding, as well as construction residue, asphalt treatments, machining and manufacturing waste, metal primers and paint, and any exposed materials that may be stored externally at a facility. Particularly when rain falls at a high rate, as during a storm, and after a period of little precipitation, storm water runoff from an industrial area may carry significant amounts of contaminants.

There is little to no published literature or research on the control and mitigation of storm water runoff from industrial sites. There is however substantial state and federal regulation of storm water runoff from industrial sites. The result is that industrial sites often find themselves with permits for storm water discharge that limit constituents such as chemical oxygen demand, total suspended solids, oil and grease, turbidity or color, and limit metals such as copper, zinc, and lead, all of which may be construed to be deleterious to downstream receiving water bodies.

Various structures and methods for removing various suspended and dissolved impurities from storm water are disclosed in, for example, Stewart et al., U.S. Pat. No. 5,322,622; Herman et al., U.S. Pat. No. 7,037,423; Knutson et al., U.S. Pat. No. 5,707,527; Lenhart, Jr. et al., U.S. Pat. No. 6,027,639; Allen II et al., U.S. Pat. No. 8,110,105; Aberle et al., U.S. Pat. No. 7,214,311; Aberle et al., U.S. Pat. No. 7,419,591; Hersey et al., U.S. Pat. No. 7,517,450; Hersey et al., U.S. Pat. No. 8,110,099; Buelna, U.S. Pat. No. 6,100,081; Lambert, V et al., U.S. Pat. No. 8,216,479; Adams et al., U.S. Pat. No. 8,147,688; and Schluter et al., U.S. Pat. No. 7,186,058.

Various shortcomings in treatment of storm water runoff remain despite the prior art mentioned above, in that the storm water treatment apparatus disclosed is undesirably expensive to manufacture and maintain, that large areas of land may be required to contain various components of such systems, and that the effectiveness of the storm water treatment systems previously available is less than desired.

What is desired, then, is a storm water treatment system that can be constructed at a moderate cost, that is not particularly complex, and that is more effective than previously known storm water treatment systems.

SUMMARY OF THE INVENTION

In response to the above-mentioned shortcomings of the prior art, the present invention provides an answer to at least some of the shortcomings of the prior art, as defined in the claims that are part of the present disclosure.

As one aspect of the present invention, a storm water catchment and treatment apparatus is disclosed that is designed to reduce significantly the total copper and total zinc contained in industrial site storm water runoff.

In one embodiment, the storm water treatment system disclosed includes the use of high quality compost which is high in humic acid and which may be manure-based, leaf-based, or woody biomass-based, as a filtering and capture media, and which capitalizes specifically on the fact that humic acid is a chemical chelating and sequestering agent effective for the capture of copper, zinc and other storm water contamination likely to be found in industrial site runoff, including some organic compounds of interest.

One embodiment of the system disclosed herein includes a distribution system intended to ensure complete and intimate contact of the storm water over a large surface area of the filter media, and the embodiment disclosed provides for continuous wetting of the compost media that ensures fresh and active compost rich in humic acid at all times.

In a treatment container embodying an aspect of the invention, length, width, and height dimensions maximize the distribution of storm water through the amount of filter media available for treatment of storm water in order to result in very low flow velocity through the filter media, to maximize contact time between the storm water and compost filter media so that the chelating reaction between the heavy metals of the storm water and the humic acid in the compost can reach equilibrium and be complete.

The foregoing and other objectives and features of the invention will be more readily understood upon consideration of the following detailed description of the invention taken in conjunction with the accompanying drawings.

DETAILED DESCRIPTION OF PREFERRED EMBODIMENTS

Figure 1:
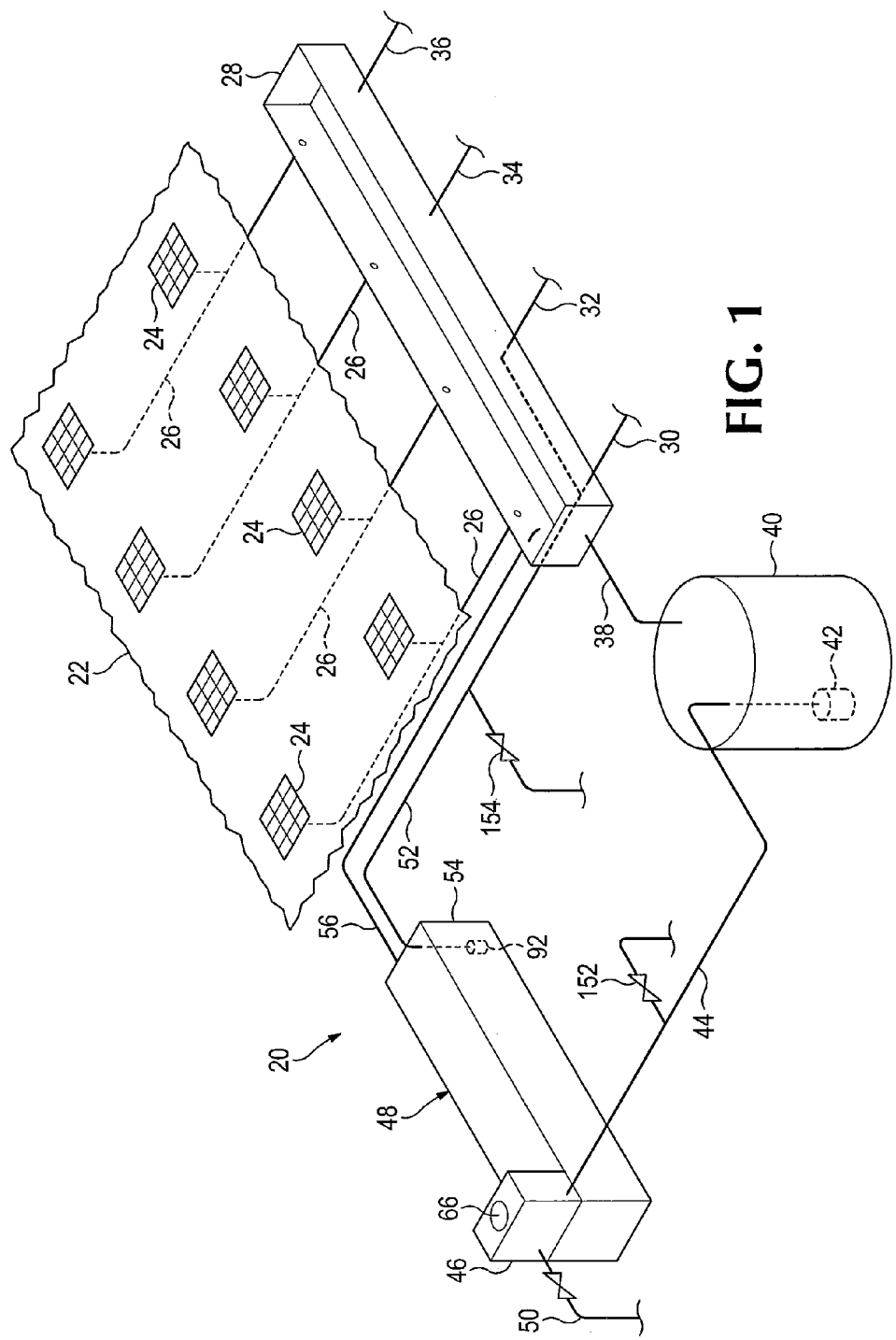
FIG. 1 is a partially diagrammatic perspective view of a storm water drainage and treatment system which is an embodiment of the present invention.
Figure 2:
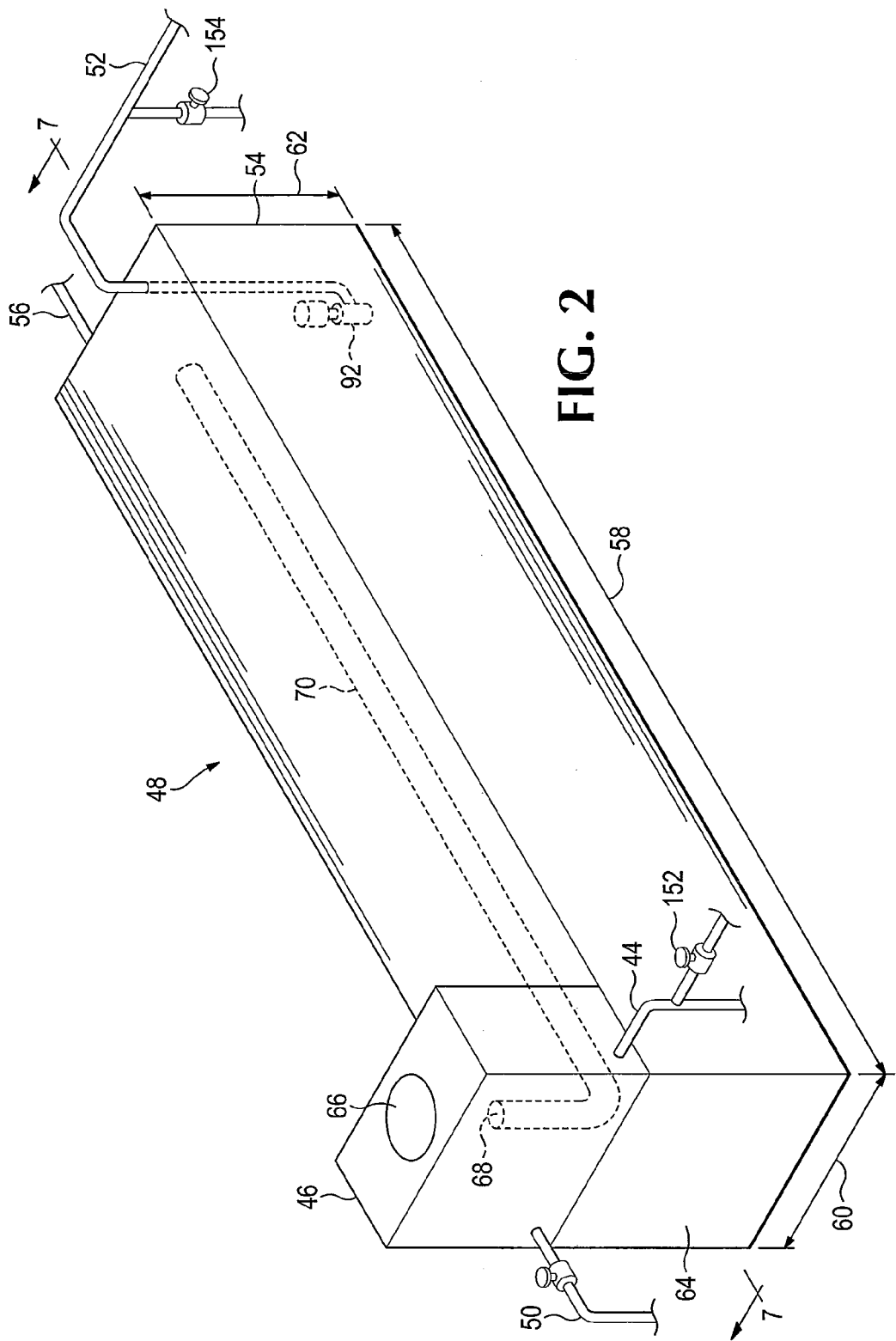
FIG. 2 is a partially cutaway isometric view of a storm water treatment container according to the present disclosure.

Referring now to the drawings that form a part of the disclosure herein, and referring first to FIGS. 1 and 2, a storm water collection and treatment system 20 shown in FIG. 1 may be used to collect runoff from an area 22 in which storm drains 24 collect runoff into underground collection pipes 26. Catch basins in storm drains 24 may include fabric filter inserts to retain larger granular and suspended solids to prevent clogging of the collection pipes 26 and downstream conduits and protect system pumps. The underground collection pipes 26 may lead to one or more intermediate collection containers 28, such as a drainage consolidation trench that may have been available before installation of the storm water collection and treatment system disclosed herein, or that may be constructed specifically to receive and accumulate quantities of runoff collected from the drainage area 22, as a buffer to deal with surges in runoff quantity.

In the exemplary storm water collection and treatment system 20 shown in FIG. 1, a utility trench may be used as the intermediate collection container 28 to accumulate a sizeable quantity of runoff water. Discharge pipes 30, 32, 34, and 36 may be associated with the intermediate collection container 28 and may be used eventually to discharge treated water to a sewer system or other final discharge receptacle after treatment in the collection and treatment system 20, as will be explained more fully presently. The discharge pipes 30, 32, 34, and 36 may serve as emergency overflow discharge conduits in an extremely exceptional situation.

A storm water delivery pipe 38 drains the intermediate collection container 28, or if there is no intermediate collection container 28 it accumulates the runoff carried through the several underground drain pipes 26 and delivers the consolidated amounts of storm water to a collection container 40. At least one pump 42 is arranged to pump accumulated storm water from the collection container 40 through a feed pipe 44 to a feed tank 46 associated with the treatment container 48. A secondary water supply pipe 50, such as a pipe connected to a source such as a municipal water supply is also connected with the feed tank 46.

A conduit 52 leads from an outlet end 54 of the treatment container 48, to carry treated storm water to the discharge pipe 30. An emergency overflow discharge pipe 56 may lead from the treatment container 48 to the intermediate collection container 28, or to another emergency path for discharge of untreated water in extremely unusual situations as will be explained in greater detail presently.

Referring next to FIG. 2, the treatment container 48 has a length 58, a width 60, and a height 62. The feed tank 46 is mounted atop the treatment container 48 and may be supported by it, at the inlet end 64 of the treatment container 48. The length 58, width 60, and height 62 of the treatment container 48 may be comparable to those of a highway semi-trailer or intermodal cargo container, in order that the treatment container 48 may be convenient to transport over a highway between its point of manufacture and a location where it is to be installed. In one embodiment, as depicted here, the treatment container 48 may be made by suitably strengthening and modifying a 45-foot cargo container.

A manhole 66 may be provided in the top of the feed tank 46. Water introduced into the feed tank 46 through the feed pipe 44 is allowed to rise within the feed tank 46 to the level of the upwardly open mouth 68 of a sparger 70 that extends upward within the feed tank 46. The sparger 70 is supported within the treatment container 48 and extends horizontally along its length near the top of the treatment container 48.

As will be explained more fully below, a filter bed 72 is contained within the treatment container 48 beneath the sparger 70. The filter bed contains media which may be principally a compost of high-quality manure or yard debris, rich in humic acid.

Figure 3:
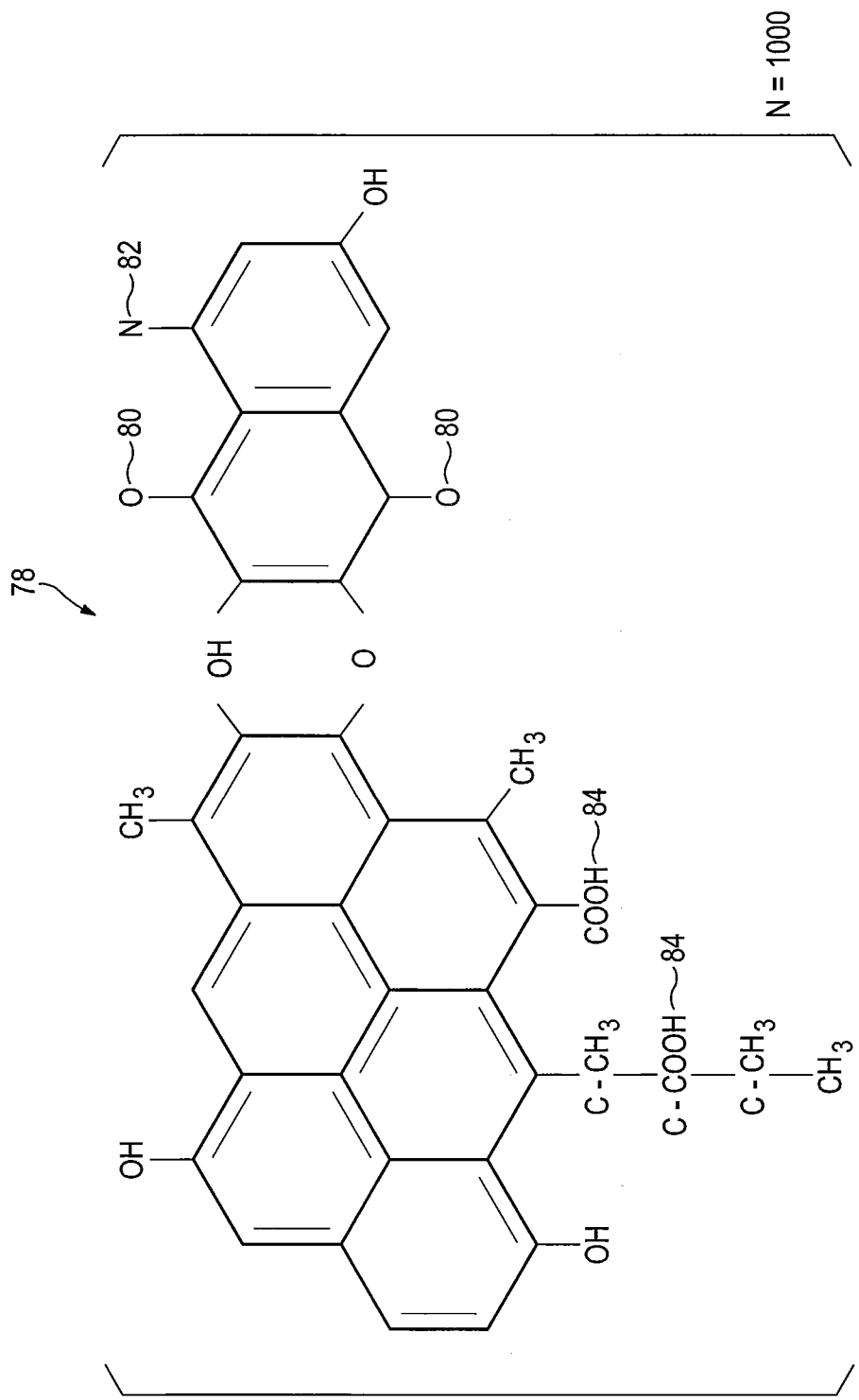
FIG. 3 shows a structural formula of a humic acid molecule.

Composts based on cattle manure or yard debris, particularly leaves are particularly rich in humic acid. This is particularly important with respect to storm water treatment, in that humic acid, whose structure is illustrated in FIG. 3, is a very strong metal chelator, meaning that the chemical structure of humic acid has a distinct affinity to attract cationic metals such as copper, zinc, lead, manganese and others. The "O" or phenolate radical 80, "N" or primary amine radical 82, and "COOH" or carboxylate radical 84, because of their relationship to the benzene ring structures 86 to which they are attached in the humic acid monomer, contribute to the ability of humic acid to strongly attract metal ions. The phenolate radical 80, primary amine radical 82, and the carboxylate radical 84 are shown, respectively, in FIGS. 4, 5, and 6.

Figure 6:
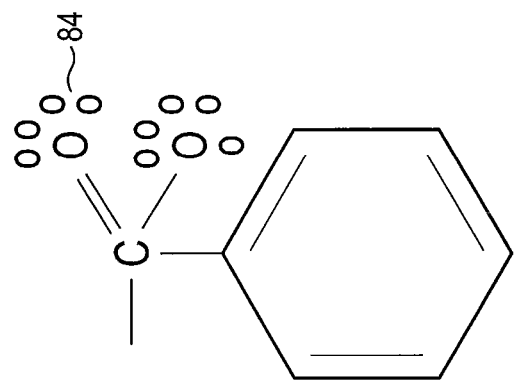
FIG. 6 shows a structural formula of a carboxylate radical.
Figure 5:
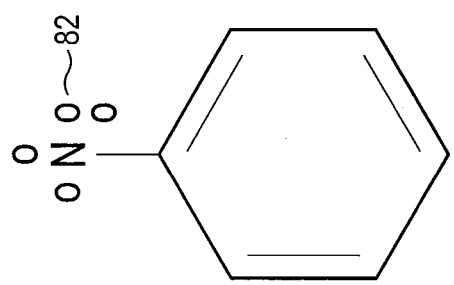
FIG. 5 shows a structural formula of an amine radical.
Figure 4:
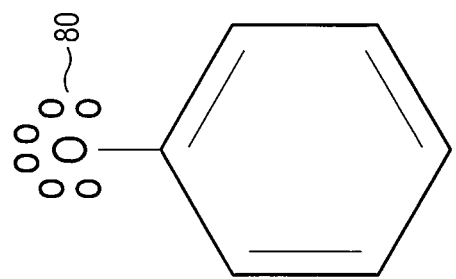
FIG. 4 shows a structural formula of a phenolate radical.

The three radicals 80, 82, and 84, shown in FIGS. 4, 5, and 6, exist as integral parts of the humic acid structure and are termed "ligands." Humic acid is a polymeric compound, often with at least 1,000 of the monomeric structures such as those shown in FIG. 3. The radicals 80, 82, and 84 are "electron-rich" anions and therefore have a need to bond with +2 or +3 valence cations such as $Cu^{++}$, $Zn^{++}$, $Fe^{++}$, or $Al^{+++}$. When a metallic cation such as one of these bonds to a ligand structure such as a phenolate, amine, or carboxylate radical, the resulting bond is called a chelate. Chelates form very strong bonds and are highly stable, particularly within the pH range of 5.5 to 7.5, which is consistent with the pH of stormwater.

Therefore, while the prior art has described the use of compost in connection with treating storm water, there has not been an explanation of how and why compost works as an effective "cleanser" of heavy metals from storm water. It is in part through this chelating ability that the storm water treatment system described herein has achieved 83% to 96% removal rate for copper and 91% to 97% removal rates of zinc from industrial site storm water runoff. These removal rates have been achieved even at relatively low inlet concentrations and can provide final outlet concentrations well below 0.020 mg/L for total copper and 0.12 mg/L for total zinc. The treatment system disclosed herein routinely achieves similar results for effluent with a large percentage of the loading coming from dissolved zinc and dissolved copper, which are particularly problematic pollutants.

Figure 7:
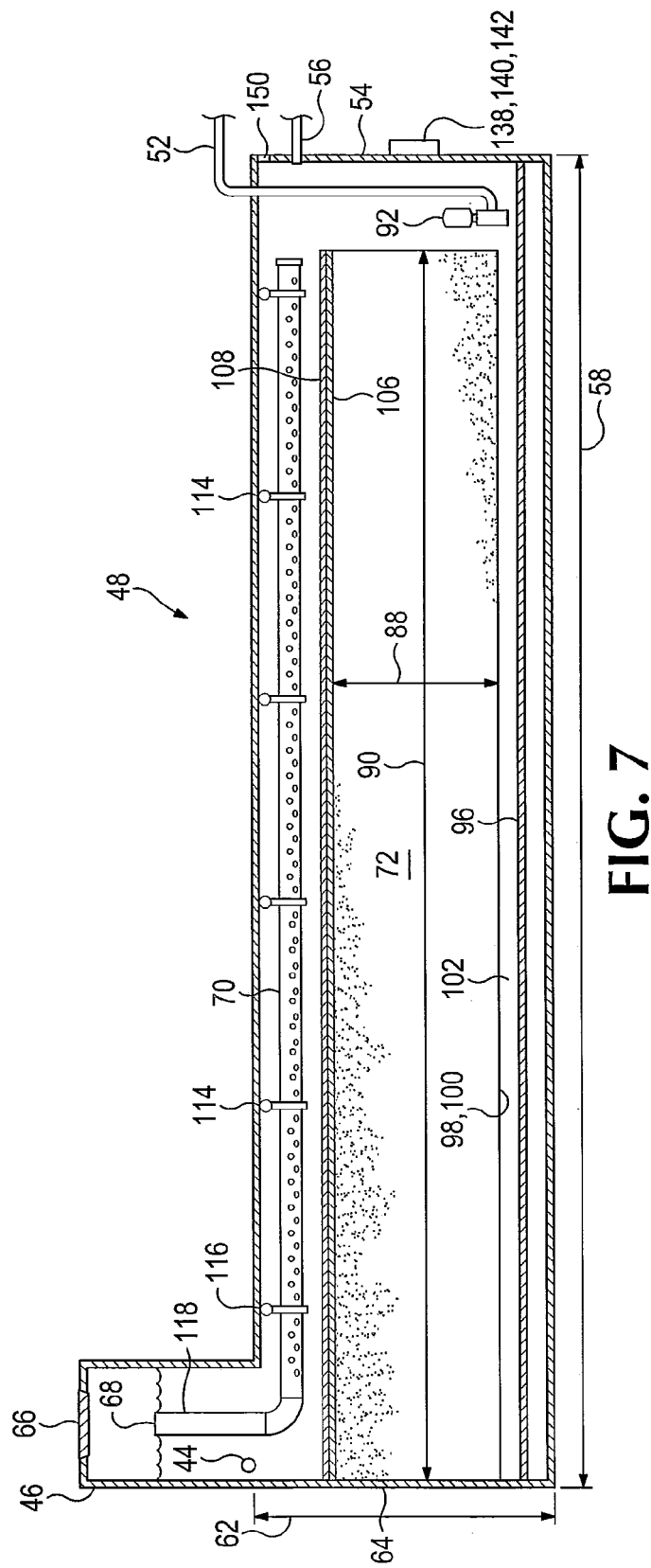
FIG. 7 is a sectional view of the storm water treatment container shown in FIG. 2, taken along line 7-7.
Figure 8:
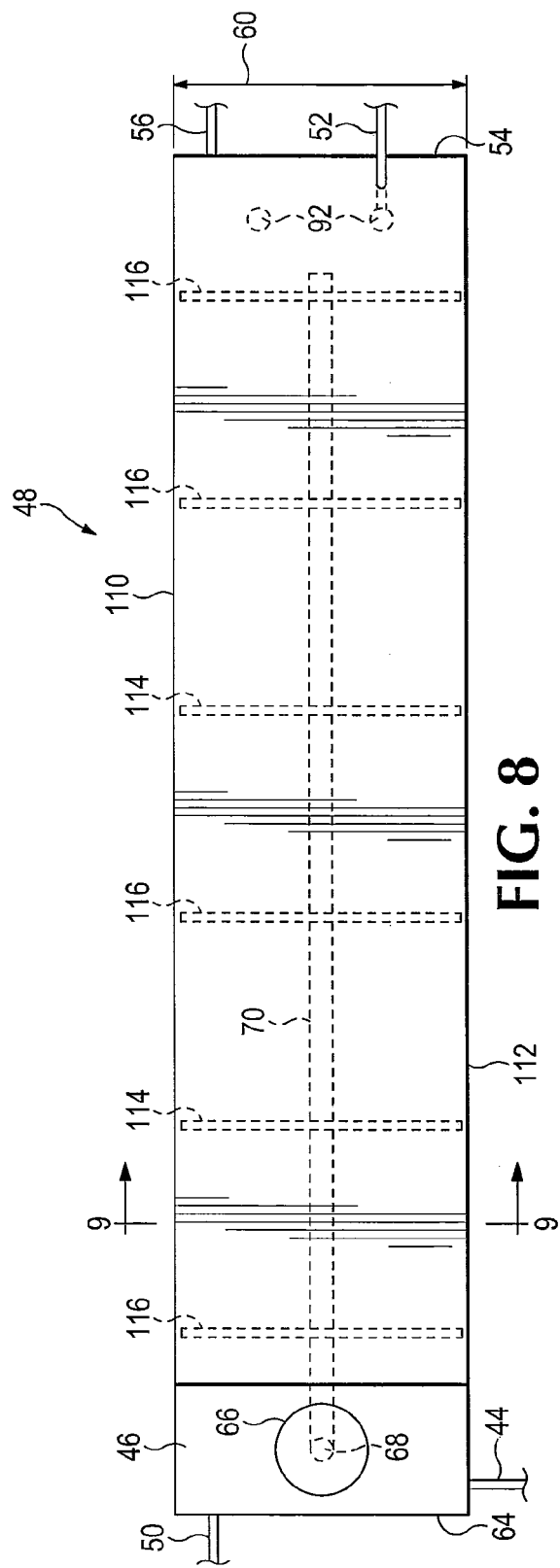
FIG. 8 is a top plan view of the storm water treatment container shown in FIG. 2.
Figure 9:
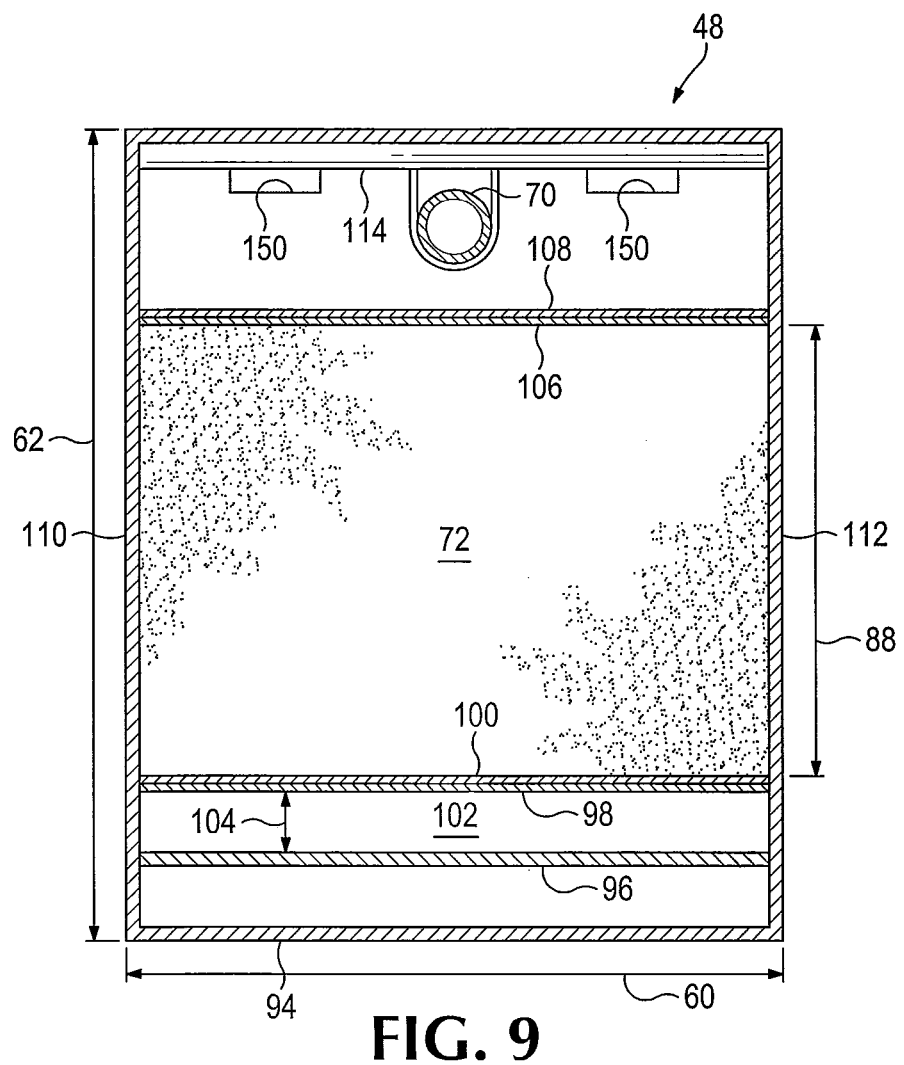
FIG. 9 is a sectional view of the storm water treatment container shown in FIGS. 2, 7 and 8, taken along line 9-9 in FIG. 8.

Referring next to FIG. 7, which is a sectional view of the treatment container 48 and the feed tank 46 from one side, it can be seen that the overall exterior length dimension 58 of the treatment container 48 is approximately 45 feet, and its height 62 is about 9 feet. The width 60, shown in FIGS. 8 and 9, is about 8 feet.

The compost filter media bed 72 is supported within the treatment container 48, and may have a depth 88 in a range of 1.5 feet to 6 feet, and in one embodiment a depth 88 of about three feet. A depth as shallow as one foot of compost may risk having the compost media fail to remain suitably even in depth. The treatment container 48 may, for example, be a converted 45-foot long intermodal cargo container, strengthened as necessary to contain the weight of the filter bed 72 and any load of water, which in an extremely exceptional case might fill the entire container, for a total of around 15,000 gallons. As may be seen in FIG. 7, the filter bed extends from the inlet end 64 toward the outlet end 54, but does not extend over the entire length 58. Instead, the filter bed 72 may extend for a lesser distance 90 of about forty-two feet, leaving a space of about three feet at the outlet end 54 in which one or more pumps 92 may be located. A pump 92 is shown connected to the filtrate discharge pipe 52. As may be seen also in FIG. 9, the treatment container 48 has an underframe 94 extending horizontally at its bottom. A solid plate floor 96 is supported atop the underframe 94 and extends over the full length 58 and width 60 of the treatment container 48.

Spaced upwardly apart from the plate floor 96 and supported on suitable framework (not shown) is a water-permeable support platform 98 that may be of a material such as expanded metal, extending over the full length 90 of the bed 72 and the full width 60 of the treatment container 48. Supported by the permeable expanded metal or similar support 98 is a layer 100 of a strong water-pervious architectural fabric such as a non-woven fiber blanket durable enough and with a great enough permeability to allow water to drain freely from the filter media bed 72 into a space 102 which may have a height 104 of, for example, about 11 inches. For example, a geo-textile fabric such as a non-woven material available from Propex, Inc. of Chattanooga, Tenn. under the name Geotex 801, which is equivalent to a woven mesh size of about 80, has been found to be satisfactory.

Supported on the fabric layer 100 is the bed 72 of filter media, for which there is room for a depth 88 of six feet, although a lesser depth may be chosen. Preferably, the compost used as the filter media may be a mixture of relatively coarse granular compost and relatively fine compost. About eighty percent (80%) of the compost used in the bed may be placed into the bed first and may be relatively coarse particles, with particle size ranging up to two inches. The remaining twenty percent (20%) may be of relatively fine particle size, such as less than 0.1 inch, and down to dust. It may be placed atop the coarser compost and allowed to work its way down and be washed into the spaces between the larger particles beneath. The fabric layer 100 is capable of retaining even the fine particles of compost. For example, Geotex 801 is a non-woven geo-textile of polypropylene fibers, needle-punched to form a stable fabric network resistant to ultraviolet degradation and to biological and chemical environments normally found in soils. It has an apparent sieve-opening size of 80 (U.S.) and initially provides for a water flow of 110 gallons per minute per square foot, or 4,482 liters per minute per square meter. Thus, with the forty-two feet by eight feet size of the filter bed 72, equal to 336 square feet, 36,960 gallons per minute can flow through the bottom containment fabric layer 100, which therefore will not impede the flow of filtrate from the filter bed 72.

Atop the bed 72 of compost material is a top cover layer 106 of water-pervious fabric, which may be the same as or similar to the fabric layer 100 and which may rest atop the compost material of the filter media bed 72. Supported closely above or in contact with the fabric layer 106 is an upper retaining member 108 of rigid yet storm water-permeable material such as expanded metal. The upper retaining member 108 may be supported in one of several sets of supports spaced apart at various heights along the sides of the treatment container 48 and is preferably supported at a selected height close to the upper layer 106 of water-permeable fabric, in order to keep the fabric layer 106 in its desired location covering the top of the filter media. Geo-textile fabric filter material may essentially wrap the entire volume of compost filter media to ensure that the compost does not become plugged or otherwise compromised by sand, grit, or mud.

The treatment container 48 may have a sheet metal cover or, alternatively, may be covered by a watertight fabric, but in any case the top of the treatment container should be easy to uncover. Once the effectiveness of the compost filter media in the bed 72 begins to decrease as a result of loading of the media with matter removed from suspension in storm water, or when the humic acid content is consumed by chelation of dissolved metal ions, the compost filter bed media can be removed easily by raising and removing the expanded metal retainer member 108, which may be made up of several smaller pieces easily assembled and attached to each other, to allow removal of the permeable top layer cover 106 and then removal of the particulate compost filter media.

The sparger 70 extends along the filter bed, where it may be centrally located between the opposite sides 110 and 112 and suspended from transversely extending spreader bars 114, maintaining a spacing between the sides 110 and 112, and from other transversely extending sparger support members 116, which may, for example, be pipes or angle irons.

Figure 10:
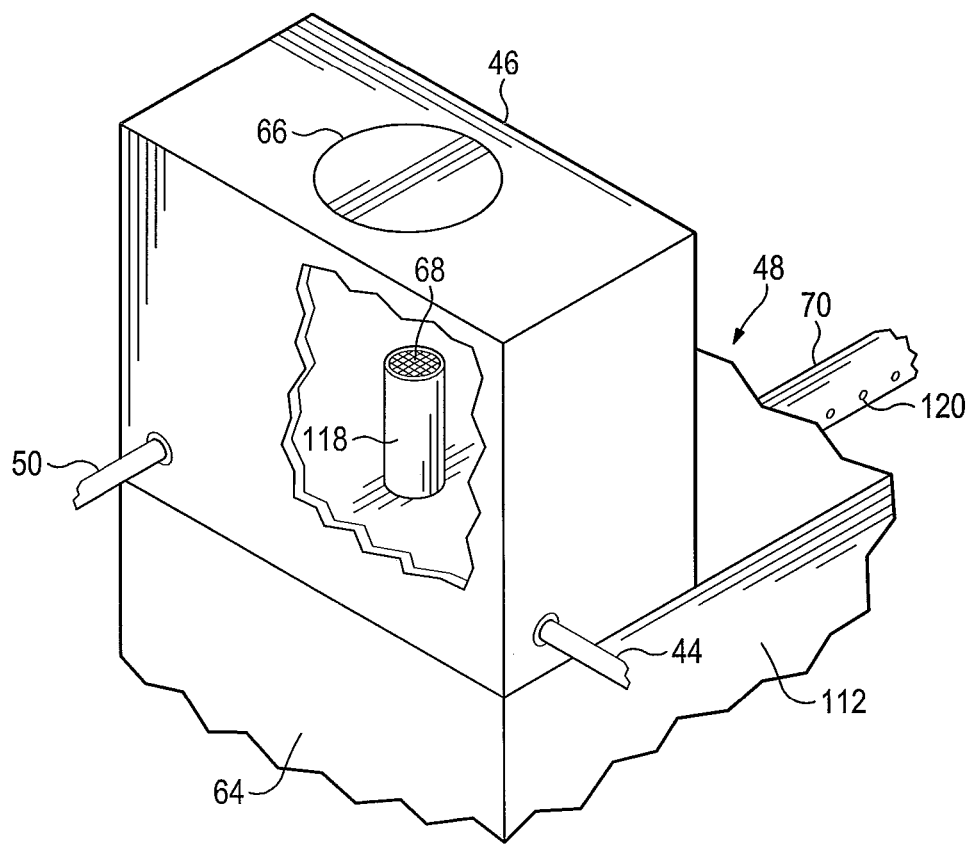
FIG. 10 is an isometric view, at an enlarged scale, showing construction of a storm water infeed tank that is associated with the storm water treatment container as shown in FIGS. 2 and 8.
Figure 11:
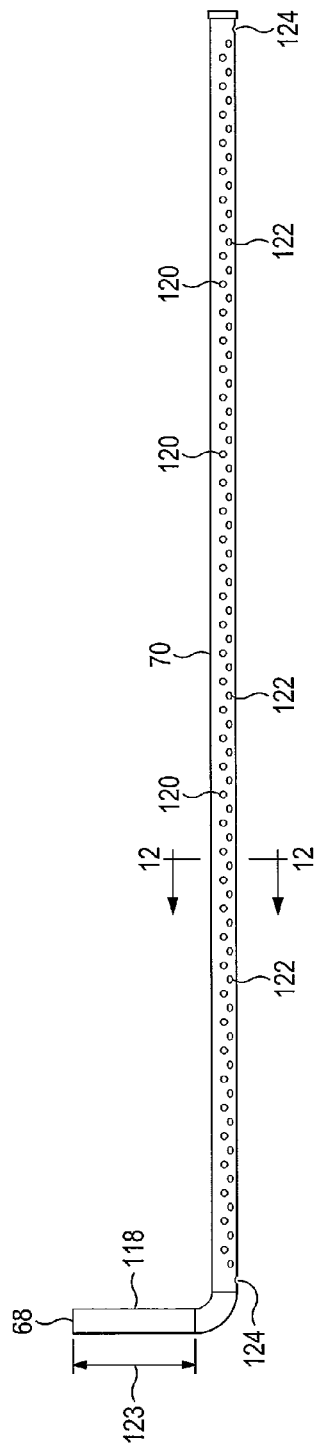
FIG. 11 is a side elevational view of the sparger included in the treatment container.
Figure 12:
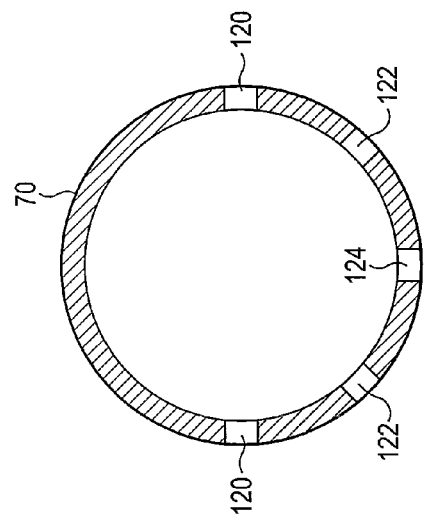
FIG. 12 is a sectional view taken along line 12-12 in FIG. 11, at an enlarged scale, showing a detail of the construction of a sparger pipe.

As may be seen best in FIGS. 10, 11 and 12, the sparger 70 includes a standpipe portion 118 that extends upward within the feed tank 46 by a distance 119 of, for example, two feet, so that storm water pumped into the feed tank 46 through the feed pipe 44 from the collection container 40 can rise within the feed tank 46 to the height of the mouth 68 of the sparger 70, allowing the water to calm somewhat and flow into the mouth 68 of the sparger 70 with some regularity. The sparger 70 is provided with holes spaced apart along its length and about the lower half of its circumference, in order to distribute storm water introduced into the mouth of the sparger pipe evenly onto the top of the filter bed 72. As may be seen in FIG. 12, there are holes 120 on each side and extending horizontally through the wall of the sparger pipe 70 to direct a spray of water laterally away from the sparger pipe toward a respective one of the sides 110 and 112. There are also holes 122 which may be oriented at forty-five degrees below horizontal in order to emit streams of storm water downwardly and laterally to a smaller distance away from the center line of the treatment tank 48 on each side of the sparger pipe 70. The holes 120 and 122 are spaced apart from one another along the length of the sparger pipe 70, with a spacing such as, for example, 10.6 inches between consecutive ones of the holes 120, which may be, for example, seven-sixteenths inch in diameter. The lower holes 122 may be spaced apart from one another by 15.75 inches and each hole 122 may have a diameter of five-sixteenths inch, for example, to achieve distribution of storm water over the entire filter bed as a result of flow into the intake 68 of the sparger 70. In order to allow the sparger 70 to drain when there is no inflow of storm water, a weeper hole 124 may be provided in the bottom of the sparger pipe 70 near each end. The sparger 70 thus ensures the entire width and length of the compost filter media is wetted during a storm water event to ensure maximum surface area contact.

The supply feed pipe 50 to the feed tank 46 can supply water, as from an outside or municipal water supply, to the sparger 70 when needed to ensure the compost filter media is continuously wetted. It is this feature in particular that keeps the compost active and rich in humic acid necessary for the capture of heavy metals from storm water.

The water supply provided via the feed pipe 50 can be programmed or operated under manual control as required to keep the filter bed material moist, either by regular observation of the filter bed 72, or by routinely delivering water to the feed tank 46 after a predetermined number of days without rainfall in a significant amount. It is important, however, that the filter media be maintained in a moist condition in order to continue to support biological activity within the compost material in order to continue to develop and maintain humic acid within the compost material.

When a significant rainfall occurs and runoff travels to the storm drain inlets 24 shown in FIG. 1 in sufficient quantity to accumulate in the collection tank 28 and eventually enter into the collection container 48, it is pumped into the feed tank 46 by the pump 42 and then runs through the sparger 70 to be distributed atop the filter bed 72. After passing through the filter bed into the filtrate collection space 102 beneath the expanded metal bottom layer 98, the filtrate, or treated storm water, is drawn from the space 102 by the filtrate pump 92 and discharged through the discharge pipe 52 at the outlet end of the treatment container 48.

This configuration ensures that storm water is conveyed through a collection system and over 99% of the storm water is carried into contact with the compost filter media in the bed 72.

Because of the unique physical construction of the compost filter, the manner in which the storm water is evenly distributed to the entire length and width of the compost media, and the sheer volume of the compost media in the bed 72, water flow velocity through the system is very low, which results in extended contact time between the humic acid rich compost and the metal laden storm water. This is critical in that it allows complete chemical reaction equilibrium to be reached between dissolved metals in the storm water and the humic acid in the compost. The design velocity of water through the filter media in the bed 72 is a mere 0.42 inches or less per minute. Therefore, if the compost media bed is 6 feet (72 inches) in depth, at the design down flow velocity of 0.42 inches per minute, it takes storm water 2.86 hours to travel from the top of the compost bed to the bottom of the compost bed. 2.86 hours is a very significant amount of contact time between the dissolved metals and humic acid. Additionally, because of the chemical reaction occurring with the humic acid present in the compost as well as the natural aerobic biology present in the compost, the compost generates heat. Heat is in turn a catalyst which speeds the chelating chemical reaction between the metals in the storm water and the humic acid in the compost. The rate of reaction in this system follows the Arrhenius Rate Law of Chemical Kinetics. The Arrhenius equation is complex and is known as:

$$k = Ae^{(-E_a/RT)} \quad \text{[Equation 1]},$$

wherein
K=reaction rate;
A=reaction frequency factor;
e=mathematical exponent function (natural logarithmic base) approximately equivalent to 2.71828;
$E_a$=activation energy;
R=universal gas law constant; and
T=absolute temperature.

Referring to this equation in simpler terms, we can say the following:

$$\text{Reaction Rate} = k[A]^a[B]^b \quad \text{[Equation 2]},$$

wherein
K=rate constant;
A=concentration of substance A (the metals in storm water in this case); and
B=concentration of humic acid present in the compost.

In chemistry, one reactant is often present in excess as compared to the other reactant. For these purposes, the humic acid concentration will always exceed the concentration of heavy metals in storm water. In chemical kinetics, we would therefore write that equation as:

$$\text{Rate} = k[A]^1 \times [B]^2$$

This essentially means that the rate of this reaction will proceed as a function of the square of the humic acid concentration. Further, if we look back to the Equation 1 above, we can see a temperature factor, T. Mathematically, it can be determined that for each 10° C. rise in temperature of the bed 72 of compost filter media, the rate of reaction will double.

The equilibrium concentration between the metals in the storm water and the humic acid in the compost is therefore reached at a continually increasing rate of speed as the reaction raises the temperature—a speed which ensures that the equilibrium reaction occurs in considerably less time than 2.86 hours (i.e., the time storm water takes to permeate from the top of the compost bed 72 to the bottom of the compost bed, with a depth 88 of six feet).

For example, the intermediate collection container 28 may have a capacity of 8,850 gallons, and the storm water collection container 40 may have a capacity of 7,750 gallons, in addition to the capacities of the various pipes interconnecting the storm drains 24 with the intermediate collection container 28 and the collection container 40. With this capacity, the storm water treatment system 20 described can easily deal with collecting the volume of rainfall on an area 22 of, for example, 3.5 acres served by the storm water collection and treatment system 20, resulting from a relatively rare rainfall event delivering 1.8 inches of rain in a period of six hours (27,154 gallons per acre-inch multiplied by 3.5 acres equals 171,071 gallons), or an average of 0.417 cubic feet or about 3.12 gallons per second.

Figure 13:
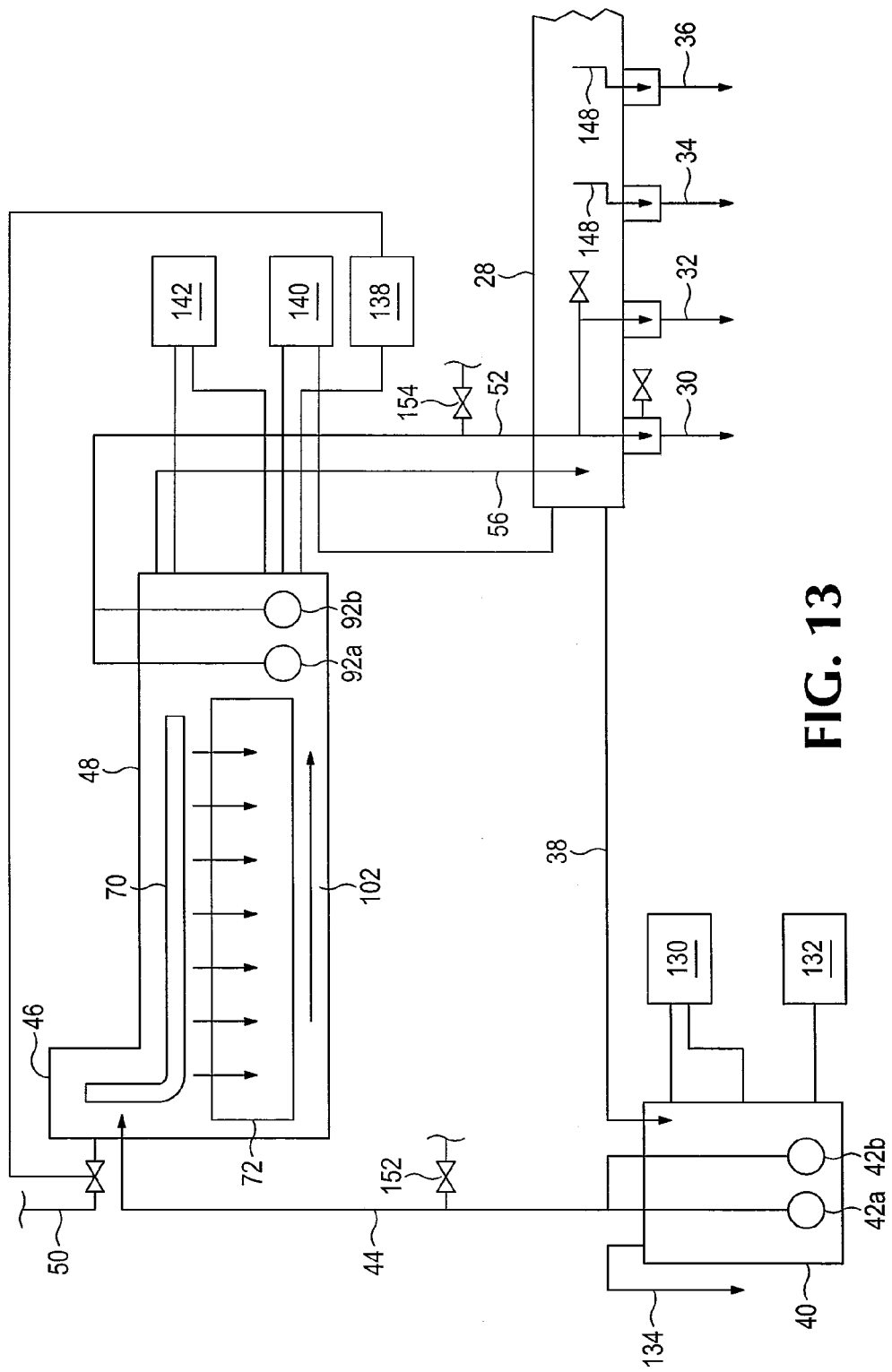
FIG. 13 is a schematic diagram of a storm water treatment system similar to that shown in FIG. 1.

In FIG. 13, a schematic diagram of a storm water collection and treatment system similar to that shown pictorially in FIG. 1 and described hereinabove, with respect particularly to the treatment container 48 and feed tank 46, shows that there may be, for example, a pair of pumps 42 in the collection container 40, with a water level sensor 130 arranged to operate a first pump 42a of a lower capacity, such as forty gallons per minute (40 gpm) when water in the collection container 40 is detected by a sensor 132, and to start a second, larger-capacity (e.g., 125 gpm) pump 42b when the water level has reached a predetermined level as determined by the sensor 130, and to send an alarm when the water level has reached an even higher point and appears to overwhelm the capacity of both pumps 42a and 42b together. An overflow drain 134 may be provided to protect the collection container 40.

Similarly, with respect to the treatment container 48, a first pump 92a may be energized by a control panel 140 when water is detected in the space 102 by a sensor 138, which may also be arranged to control a valve in the secondary water supply pipe 50. When the water level has risen to a higher level, a control panel 142 energizes a second, larger-capacity pump 92b in parallel with the smaller-capacity pump 92a, and at a chosen higher level can provide an alarm signal. The discharges from the pumps 92 proceed as previously explained through the discharge pipe 52 and into the discharge pipe 30 and, depending on the volume of discharge through the pipe 52, may also be directed into the discharge pipe 32, as well. Scuppers 150 may also be provided in the treatment container 48, as shown in FIG. 9, to provide a discharge route for overflow.

Figure 14:
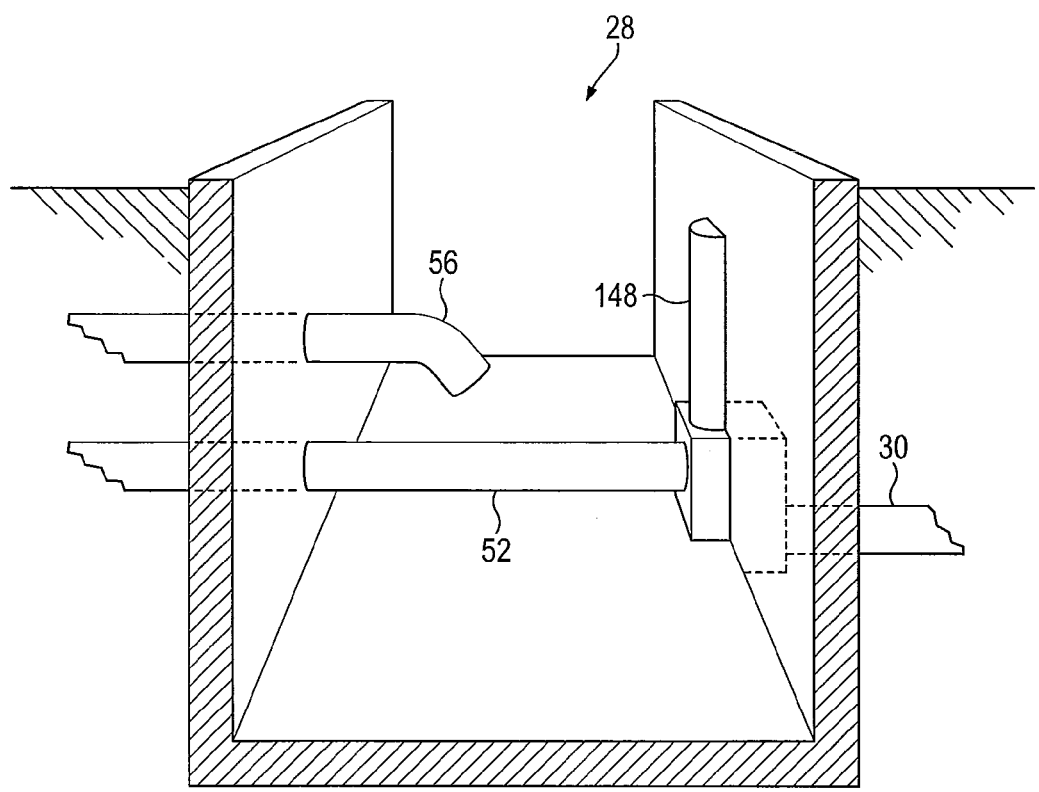
FIG. 14 a partially cutaway, partially schematic, perspective view of an overflow buffer container for filtrate that may be included in the storm water treatment system disclosed herein.

Should the flow of water into the feed tank 46 and into the treatment container 48 become so great that the pumps 92 are overwhelmed, or should electrical power to the pumps 92 be interrupted and water level overflow the space 102 and rise high enough, the overflow pipe 56 can carry a portion of the excess water to the intermediate collection container 28, which can act as a buffer at least temporarily. If the quantity of water in the intermediate collection container 28 becomes excessive, water may overflow, as shown in FIG. 14, into an overflow inlet 148, which may be in the form of a semicylindrical standpipe rising along a wall of a utility trench, allowing excess water to flow down into the inlet of the discharge pipe 30.

As examples, several measurements were made of the performance of the system after rainfall events. Sampling for tests was accomplished after a large enough rain event so that there would have been enough flow from rain runoff to go entirely through the treatment container 48. Storm water runoff from the area 22 should be great enough in volume to go completely through the treatment container after a rain event of roughly 0.25 inch rainfall in a period of 24 hours or less. A sampling valve 152 may be provided in the feed pipe 44 to the feed tank 46, and a "before treatment" sample is taken from that point in the system, before the water is deposited into the feed tank 46 leading to the mouth 68 of the sparger 70.

Samples of treated water may be taken through a sampling valve 154 provided for that purpose in the outlet conduit 52, at the outlet end 54 of the treatment container 48.

The performance of the system, as measured in each of six separate tests, is shown in Table 1 below, entitled Removal Efficiency Information for Certain Materials.

tively. The treatment system 20 has been tested a number of times, and there seems to be little variation in efficiency of removing pollutants during rain events of different magnitudes.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A storm water treatment system, comprising
    (a) a filter and water treatment apparatus including:
        (i) a treatment container having a length, a width, and a height;
        (ii) a water filter and treatment media support platform within the treatment container including a water-pervious fabric bottom filter media containment layer;

TABLE 1

Removal Efficiency Information for Certain Materials

| Test Number | Cu Total (mg/L) Inlet | Cu Total (mg/L) Outlet | Removal Efficiency | Cu Dissolved (mg/L) Inlet | Cu Dissolved (mg/L) Outlet | Removal Efficiency | Zn Total (mg/L) Inlet | Zn Total (mg/L) Outlet | Removal Efficiency | Zn Dissolved (mg/L) Inlet | Zn Dissolved (mg/L) Outlet | Removal Efficiency |
|---|---|---|---|---|---|---|---|---|---|---|---|---|
| 1 | 0.047 | ND (0.0100) | 89%[1] | | | | 0.368 | 0.0276 | 93% | 0.405 | 0.0166 | 96% |
| 2 | 0.036 | 0.0060 | 83% | | | | 0.414 | 0.0216 | 95% | 0.780 | 0.0219 | 97% |
| 3 | | | | 0.0497 | 0.0054 | 89% | | | | 0.398 | 0.0347 | 91% |
| 4 | | | | 0.048 | 0.0064 | 87% | | | | 0.320 | 0.0115 | 96% |
| 5 | 0.165 | 0.0198 | 88% | | | | | | | 0.858 | 0.0792 | 91% |
| 6 | 0.070 | 0.0111 | 84% | | | | 0.614 | 0.0396 | 94% | | | |

Note
[1] The indicated removal efficiency is an estimate because the outlet concentration was below the method detection limit of 0.0100 mg/L for this analysis, so the concentration was taken at ½ of the detection limit or 0.0050 mg/L.

As shown in Table 1, the average removal efficiency for total copper content was determined to be 84%, with a range of 83% to 89%.

The average removal efficiency for dissolved copper was 88%, with a range of 87% to 89%, as shown in tests three and four.

The average removal efficiency for total zinc was 94%, with a range of 93% to 95%.

The average removal efficiency for dissolved zinc was 94%, with a range of 91% to 97%.

The removal efficiencies determined and shown in Table 1 are particularly impressive with respect to removal of dissolved copper and dissolved zinc, which are the most difficult pollutants to remove, among those normally subject to regulation in industrial storm water runoff permits. The results obtained were consistently below the very low regulatory thresholds permitted by states such as Oregon (0.020 mg/L for copper and 0.12 mg/L for zinc) and Washington (0.0144 total copper and 0.117 mg/L for total zinc).

The filter system operates with a water velocity through the filter media that is dependent on the flow rate of the pumps operating in the system. The storm water treatment system 20, as shown in FIGS. 1 and 13, flows at 45 gallons per minute under quote normal unquote conditions and at 165 gallons per minute when the rain intensity increases to the high flow rate set point. The 45 gallon per minute and 165 gallons per minute rates correspond to vertical mean space velocity through the media bed at 0.11 in./m or 0.42 in./m, respec- (iii) a filter bed of particulate compost filter media within the support space, supported by the containment layer;
(iv) a cover layer of water-permeable fabric resting on the filter and treatment meshes;
(v) a sparger arranged to wet the top of the cover layer and distribute storm water over the filter bed; and
(vi) a filtrate collection space beneath the media support platform;
(b) a storm water collection and delivery system arranged to provide storm water to the sparger;
(c) a filtrate removal and discharge system; and
(d) a make-up water supply system arranged to provide water to the sparger as needed, to keep the filter bed continuously moist by distributing a quantity of water over the top of the filter bed through the sparger.

2. The storm water treatment of system of claim 1 wherein the treatment container has a filtrate-permeable bottom support member beneath the filter fabric bottom containment layer and defining a bottom of the media support platform.

3. The storm water treatment system of claim 1 wherein the compost filter media is a mixture of fine and coarse compost having a high initial humic acid content.

4. The storm water treatment system of claim 3 wherein the filter media is a compost of steer manure.

5. The storm water treatment system of claim 3 wherein the filter media is a compost of deciduous leaf material.

6. The storm water treatment system of claim 1 including a storm water-permeable containment member disposed over the cover layer of water-pervious fabric.

7. The storm water treatment system of claim 1 including a storm water feed tank mounted above the treatment container and arranged to deliver storm water to the sparger.

8. The storm water treatment system of claim 1 wherein the collection and delivery system includes an intermediate storm water collection container acting as a storage capacity buffer for accumulating a predetermined volume of storm water runoff during and following a storm event.

9. The storm water treatment system of claim 1 wherein the treatment container is a structure approximately the size of a commercial intermodal cargo container.

* * * * *